(12) United States Patent
Simon et al.

(10) Patent No.: US 9,702,390 B2
(45) Date of Patent: Jul. 11, 2017

(54) DEVICE FOR THE ATTACHMENT OF AN OBJECT BY INJECTION OF LIQUID

(71) Applicant: AIRBUS OPERATIONS (SAS), Toulouse (FR)

(72) Inventors: Daniela Simon, Toulouse (FR); François Rouyre, Cornebarrieu (FR)

(73) Assignee: Airbus Operations (S.A.S.), Toulouse (FR)

( * ) Notice: Subject to any disclaimer, the term of this patent is extended or adjusted under 35 U.S.C. 154(b) by 252 days.

(21) Appl. No.: 14/568,538

(22) Filed: Dec. 12, 2014

(65) Prior Publication Data

US 2015/0167714 A1  Jun. 18, 2015

(30) Foreign Application Priority Data

Dec. 13, 2013  (FR) ..................................... 13 62630

(51) Int. Cl.
*F16B 11/00* (2006.01)
*B29C 65/70* (2006.01)
(Continued)

(52) U.S. Cl.
CPC ............ *F16B 11/006* (2013.01); *B29C 65/70* (2013.01); *B29C 65/76* (2013.01); *B29K 2021/003* (2013.01); *Y10T 403/477* (2015.01)

(58) Field of Classification Search
CPC ............... Y10T 403/47; Y10T 403/471; Y10T 403/472; Y10T 403/473; F16L 13/11;
(Continued)

(56) References Cited

U.S. PATENT DOCUMENTS 1,864,080 A * 6/1932 Madge .................... F16F 1/445
                                                    267/141.4
3,201,151 A * 8/1965 Westveer ................. F16B 1/00
                                                    137/614.04
(Continued)

FOREIGN PATENT DOCUMENTS

DE     102010051556 A1 * 5/2012 .............. F16B 5/025
DE     10 2011 000805      8/2012
(Continued)

OTHER PUBLICATIONS

Search Report with Written Opinion (foreign language) for FR 1362630 dated Sep. 1, 2014, 6 pages.

*Primary Examiner* — Joshua J Michener
*Assistant Examiner* — Matthew Gitlin
(74) *Attorney, Agent, or Firm* — Nixon & Vanderhye P.C.

(57) ABSTRACT

The invention relates to a device for the attachment of an object to another object comprising an interface insert (1) intended to be positioned between said objects and comprising a chamber (3). One of the two objects is attached to the insert (1), and the other object is attached to a mobile connecting element (2) inserted into said chamber (3). A liquid that is capable of solidifying is injected into the chamber (3) of the insert (1). As long as the liquid (4) has not solidified, the relative position between the two objects may be adjusted. Once this position is considered to be satisfactory, the solidification of the liquid (4) will permit the two objects to be set one in relation to the other.

20 Claims, 4 Drawing Sheets

(51) Int. Cl.
*B29C 65/76* (2006.01)
*B29K 21/00* (2006.01)

(58) Field of Classification Search
CPC .... F16B 3/005; F16B 7/00; F16B 11/006; F16B 11/008; B64C 1/069; B64F 5/0009; B64F 5/0081; B29C 65/54; B29C 65/542; B29C 65/544; B29C 65/546; B29C 65/548; B29C 65/70; B29C 65/76; B32B 37/1284
USPC ........................................................ 156/305
See application file for complete search history.

(56) References Cited

U.S. PATENT DOCUMENTS

| | | | | |
|---|---|---|---|---|
| 3,378,972 | A * | 4/1968 | Stanley | F16B 11/006 411/82 |
| 3,461,539 | A * | 8/1969 | Napple | F16G 11/00 174/177 |
| 4,806,041 | A * | 2/1989 | Chamayou dit Felix | E04B 1/19 403/171 |
| 5,118,214 | A * | 6/1992 | Petrzelka | F16C 3/026 188/374 |
| 5,383,740 | A * | 1/1995 | Lancelot, III | E04C 5/165 403/267 |
| 5,460,413 | A * | 10/1995 | Sampson | B29C 65/4895 285/21.3 |
| 5,564,752 | A * | 10/1996 | Sampson | B29C 65/4895 285/21.1 |
| 5,660,492 | A * | 8/1997 | Bathon | C09J 5/00 403/265 |
| 5,670,183 | A * | 9/1997 | Weihs | B29C 65/54 264/262 |
| 5,704,747 | A * | 1/1998 | Hutter, III | F16B 37/065 411/113 |
| 5,762,438 | A * | 6/1998 | Reed, II | F16B 11/008 403/265 |
| 5,848,811 | A * | 12/1998 | Sampson | B29C 65/4895 285/21.3 |
| 5,974,761 | A * | 11/1999 | Mochizuki | E04C 5/165 403/267 |
| 6,036,397 | A * | 3/2000 | Goto | F16B 11/006 403/265 |
| 6,120,207 | A * | 9/2000 | Goto | F16B 11/006 403/230 |
| 6,192,647 | B1 * | 2/2001 | Dahl | E04C 3/34 403/300 |
| 6,395,207 | B2 * | 5/2002 | Hanlon | C04B 35/638 264/234 |
| 6,533,494 | B1 * | 3/2003 | Gordon | F16B 11/006 403/187 |
| 6,840,726 | B2 * | 1/2005 | Gosling | B23P 11/022 403/31 |
| 7,003,921 | B2 * | 2/2006 | Hisano | E04C 5/165 52/223.11 |
| 7,008,156 | B2 * | 3/2006 | Imai | F16B 31/04 411/14.5 |
| 7,048,266 | B2 * | 5/2006 | Starr | B25B 31/005 254/18 |
| 7,883,657 | B2 * | 2/2011 | Pridie | B64C 3/26 264/238 |
| 7,975,444 | B2 * | 7/2011 | Holdsworth | E04B 1/043 403/296 |
| 8,714,488 | B2 * | 5/2014 | Burns | B64C 1/12 244/119 |
| 8,777,193 | B2 * | 7/2014 | Loret de Mola | F16B 5/01 267/141.5 |
| 8,864,404 | B2 * | 10/2014 | Bucknell | F16B 31/043 403/31 |
| 9,053,646 | B2 * | 6/2015 | Bednarski | G09F 7/18 |
| 9,410,322 | B1 * | 8/2016 | Du | E04C 5/165 |
| 2001/0004433 | A1 * | 6/2001 | Panzeri | B62K 19/20 403/268 |
| 2002/0134515 | A1 * | 9/2002 | Yamaguchi | B29C 65/521 156/379.6 |
| 2002/0182001 | A1 * | 12/2002 | Scheidling | F16C 1/108 403/353 |
| 2007/0134944 | A1 * | 6/2007 | Tiesler | H01R 4/26 439/34 |
| 2008/0277926 | A1 * | 11/2008 | Inman, Jr. | A61M 39/10 285/123.15 |
| 2009/0014121 | A1 * | 1/2009 | McPherson | B29C 66/342 156/296 |
| 2009/0226663 | A1 * | 9/2009 | Hutter, III | B64C 1/40 428/99 |
| 2010/0101581 | A1 * | 4/2010 | Lang | A61M 16/06 128/205.25 |
| 2011/0220267 | A1 * | 9/2011 | Blancaneaux | C08L 63/00 156/78 |
| 2012/0124805 | A1 * | 5/2012 | Dubugnon | B21D 39/03 29/428 |
| 2012/0183346 | A1 * | 7/2012 | Khan | B60Q 1/0441 403/265 |
| 2014/0174635 | A1 * | 6/2014 | Shigetomi | B29C 73/06 156/98 |
| 2015/0167714 | A1 * | 6/2015 | Simon | B29C 65/70 403/270 |
| 2015/0184688 | A1 * | 7/2015 | Dobbin | F16B 39/021 411/82.1 |

FOREIGN PATENT DOCUMENTS

| | | | | |
|---|---|---|---|---|
| EP | 2 461 048 | | 6/2012 | |
| FR | 2 830 582 | | 4/2003 | |
| FR | 2995655 | A1 * | 3/2014 | ............ B29C 73/12 |

\* cited by examiner

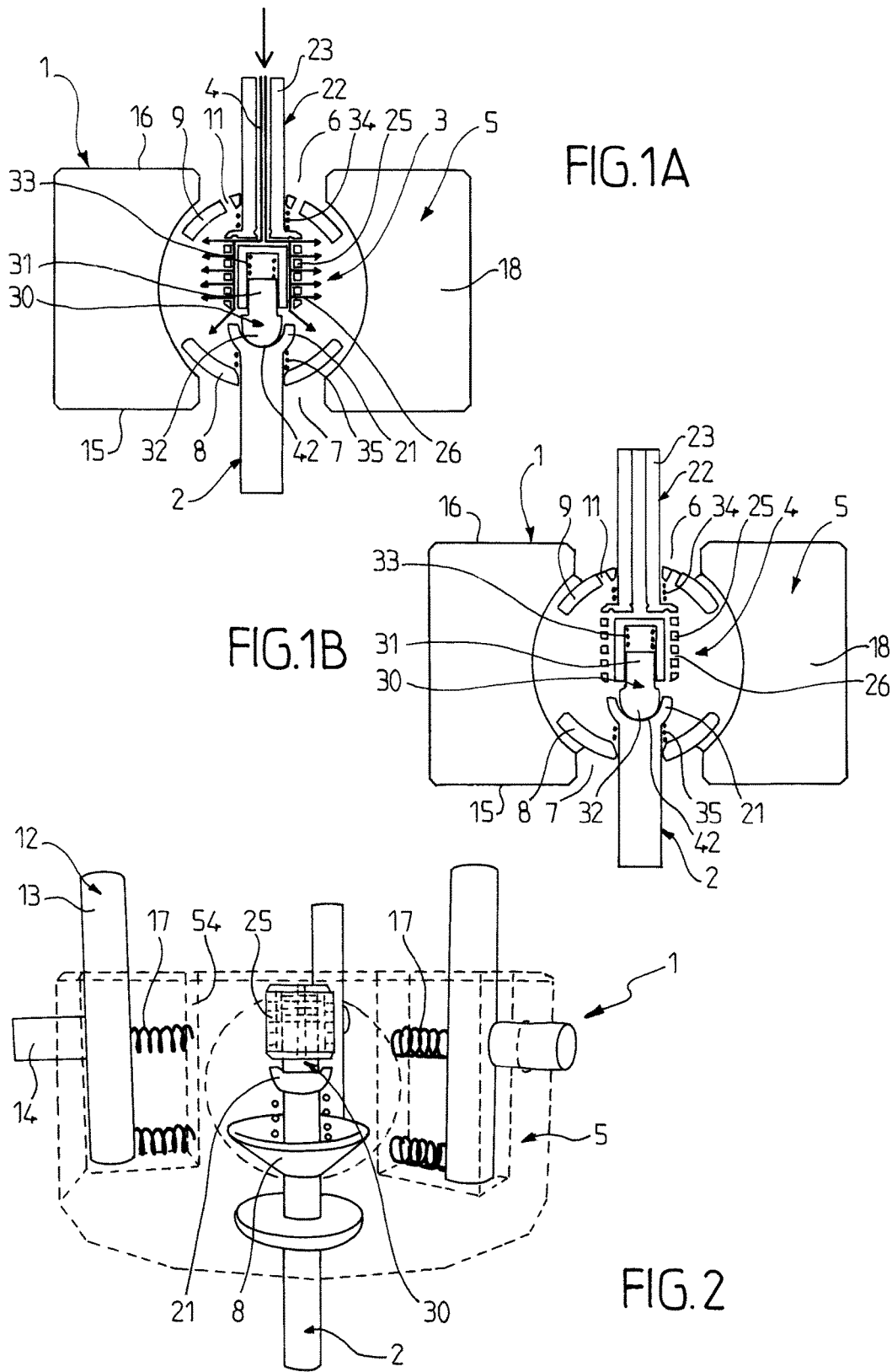

DEVICE FOR THE ATTACHMENT OF AN OBJECT BY INJECTION OF LIQUID

This application claims priority to FR 1362630 filed 13 Dec. 2013, the entire contents of which is hereby incorporated by reference.

FIELD OF THE INVENTION

The invention relates to a device for the attachment of an object by injection of liquid.

More specifically, the invention relates to a device for the attachment of an object to another object, which is simple and easy to implement because it does not involve any sophisticated tooling or any complicated handling. Such a device is versatile, in addition, because of its ability to adapt to a plurality of specific attachment configurations associated with the geometry of the two objects and with their prior arrangement. Such an attachment device is particularly suitable for voluminous structures, for example such as aircraft or railways, for which it is necessary to attach a multitude of objects, for example such as structural panels or trim panels.

SUMMARY

The invention has as its object a device for the attachment of a first object to a second object. According to the invention, such a device comprises,
- a hollow insert that is capable of being attached to the first object and delimiting a chamber,
- a mobile connecting element inserted into said chamber and capable of being attached to the second object, said chamber being capable of receiving at least one connecting liquid which is intended to solidify in order to set the relative position between the insert and the mobile connecting element.

In other words, such a device allows for a phase of positioning the two objects one in relation to the other, for as long as the liquid injected into the chamber has not solidified, and for a phase of attachment of said objects by solidification of said liquid, once said positioning is considered to be satisfactory. The connecting liquid may thus be selected at the last moment, depending on the characterizing features of the objects to be attached and their environment. In fact, by way of example, in a structure that is caused to vibrate, it will be possible to select a liquid that is capable of solidifying in the form of a damping material in order to absorb said vibrations. A device according to the invention has a universal nature, because it permits several types of attachment to be achieved without the need to modify the structural characterizing features of the insert and of the mobile connecting element. Only the liquid will require to be selected in order for it to be adapted to the envisaged type of attachment.

According to one possible characterizing feature, an attachment device according to one embodiment of the invention permits an adjustment of the relative position between the two objects for as long as the connecting liquid has not solidified, followed by setting of said position by solidification of said liquid.

According to one possible characterizing feature, the chamber possesses an inlet conduit that is capable of conveying the connecting liquid into the chamber.

According to one possible characterizing feature, an attachment device according to one embodiment of the invention comprises a source of connecting liquid that is in communication with the inlet conduit.

According to one possible characterizing feature, the source of connecting liquid is situated outside the insert.

According to one possible characterizing feature, the mobile connecting element is an elongated guide pin emerging from the insert and of which one extremity discharges into the interior of the chamber.

According to one possible characterizing feature, the pin is capable of displacement in translation into the insert in its longitudinal axis.

According to one possible characterizing feature, the guide pin is rotatably mounted in the insert so that it is able to pivot in all directions.

According to one possible characterizing feature, the inlet conduit has one extremity discharging into the interior of the chamber, said extremity terminating in a nozzle provided with at least two holes for the diffusion of the connecting liquid.

According to one possible characterizing feature, the nozzle is provided with a plurality of projecting engagement elements in order to increase the conditions of contact between the liquid and the inlet conduit.

According to one possible characterizing feature, the guide pin and the inlet conduit are connected one to the other by means of a connecting component situated inside the chamber, said component also being configured in order to permit said pin and said conduit to be aligned in the same axis.

According to one possible characterizing feature, the connecting component is in contact with a prestressed return means interacting with the nozzle in order to permit the guide pin to move in translation in its longitudinal axis in order to move closer to the nozzle of the inlet conduit.

According to one possible characterizing feature, the chamber is spherical and is delimited by two mobile rounded walls, one being passed through by the inlet conduit and the other being passed through by the guide pin, the assembly constituted by said pin, the connecting component and said conduit being capable of pivoting in the insert by sliding of said walls along the internal surface of said chamber.

According to one possible characterizing feature, a first prestressed means is placed in the interior of the chamber around the inlet conduit between the nozzle and the mobile wall that is passed through by said conduit, in order to push back said wall against the internal surface of the chamber, a second prestressed means being placed in the interior of the chamber around the pin between one extremity of said pin and the mobile wall that is passed through by this pin in order to push back said wall against the internal surface of the chamber.

According to one possible characterizing feature, a hollow and light body is inserted into the chamber in order to reduce the volume occupied by the connecting liquid.

According to one possible characterizing feature, the connecting liquid is a premixed resin.

According to one possible characterizing feature, the connecting liquid comprises an elastomer and an agent for the polymerization of said elastomer.

According to one possible characterizing feature, the insert is capable of being attached to the first object by means of reversible connecting means permitting the withdrawal of the insert.

According to one possible characterizing feature, the reversible connecting means comprise at least one prestressed retractable finger.

According to one possible characterizing feature, an attachment device according to the invention comprises,
- a hollow insert that is capable of being attached to the first object and delimiting a chamber having an inlet conduit,
- a mobile connecting element inserted into said chamber and capable of being attached to the second object, said chamber being capable of receiving at least one connecting liquid conveyed via said inlet conduit and which is intended to solidify in order to set the relative position between the insert and the mobile connecting element, said mobile connecting element being an elongated guide pin emerging from the insert and of which one extremity discharges in the interior of the chamber, the inlet conduit having one extremity discharging in the interior of the chamber and terminating in a nozzle provided with at least two holes for the diffusion of the connecting liquid, the guide pin and the inlet conduit being connected one to the other by means of a connecting component situated inside the chamber, said component being configured in order to permit said pin and said conduit to be aligned in the same axis.

The invention likewise has as its object a method for the attachment of a first object to a second object by means of an attachment device according to the invention. Such a method comprises the following stages:
- a stage for the attachment of the insert to the first object,
- a stage for the attachment of the mobile connecting element of the insert to the second object,
- a stage for the injection of the connecting liquid into the chamber of the insert,
- a stage for the attachment of the first object to the second object by solidification of said liquid inside said chamber.

The invention likewise has as its object an aircraft comprising at least one attachment device according to the invention.

BRIEF DESCRIPTION OF THE DRAWINGS

A detailed description of two possible variants of an attachment device according to the invention is provided below with reference to FIGS. 1A to 7.

FIG. 1A is a schematic view in cross section of an insert of a first possible embodiment of an attachment device according to the invention, the chamber of said insert being empty, FIG. 1B is a schematic view in cross section of the insert in FIG. 1A, the chamber of said insert being filled with a connecting liquid, FIG. 2 is a perspective view and a cut-away view of the insert in FIG. 1A.

It should be noted that the detailed description will focus on two possible variants of an insert that is capable of ensuring the attachment of a first object to a second object, and that these two possible variants ensure equivalent functions and are perfectly interchangeable as a result.

Figure 5:
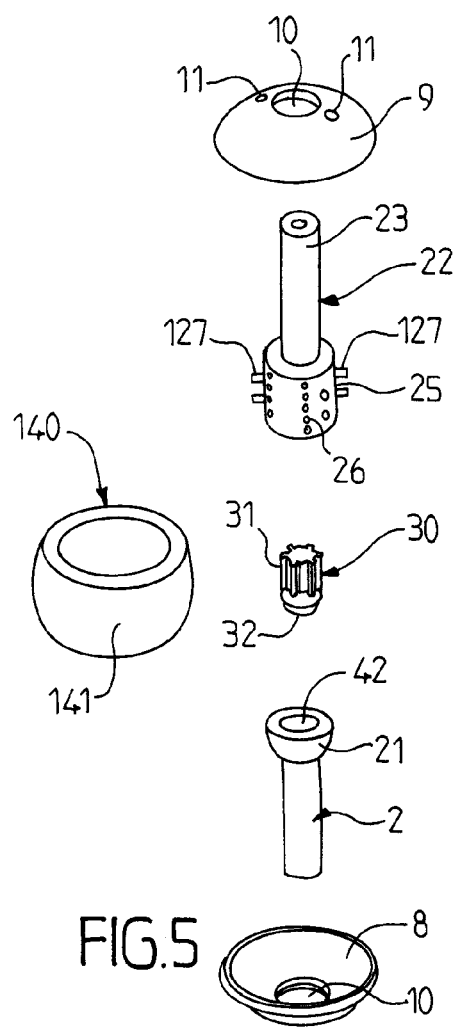
FIG. 5 is an exploded view of several components implemented in an insert of a second possible embodiment of an attachment device according to the invention.

Although FIG. 5 illustrates a second possible embodiment of an attachment device according to the invention, it may likewise be used to visualise clearly components that are common with the first possible embodiment of said device.

DETAILED DESCRIPTION

With reference to FIGS. 1A, 1B and 2, a first possible embodiment of an attachment device according to the invention comprises an interface insert 1 and a mobile guide pin 2, said insert 1 being attached to the first object and said pin 2 being attached to the second object. The insert 1 comprises the chamber 3 into which the mobile guide pin 2 is inserted, said chamber 3 being intended to be filled by a connecting liquid 4 that is capable of solidifying. This liquid 4 may be constituted by a premixed resin, for example, if all that is required is the attachment of a first object to a second object. It may likewise include chemical compounds permitting a damping solid to be obtained, for example such as a rubber, when the attachment of the first object to the second object takes place in an environment that is conducive to vibrations. In fact, the attachment of the first object to the second object by means of a rubber will thus permit the damping of these vibrations, and the elimination of all the adverse phenomena caused by said vibrations, for example such as noise pollution.

With reference to FIGS. 1A and 1B, the insert 1 comprises a hollow cylindrical body 5, delimiting the chamber 3 of substantially spherical form, placed in a central position within the insert 1. This cylindrical body has a lateral wall 18 and two circular end faces 15,16. This lateral wall 18 thus encloses the chamber 3 and two cylindrical internal channels 6,7, placed to either side of said chamber 3 and each discharging onto an end face 15,16 of the body 5 of the insert 1. In this way, the axes of revolution of these two internal channels 6,7 are in continuation one after the other and are combined with the axis of revolution of the body 5 of the insert 1. The chamber 3 is delimited in the area of each of these two channels 6,7 by a wall 8,9 that is rounded and of low thickness, having an axis of revolution. In other words, each of said walls 8,9 has a shape partially delimiting a sphere. With reference to FIG. 5, each wall 8,9 has a principal opening 10 situated in a central zone of said wall 8,9. One 9 of the two walls comprises in addition two eccentric secondary openings 11, having a reduced cross section in relation to that of said central opening 10. Each of said walls 8,9 exhibits a surface which is greater than the cross section of the internal channels 6,7, so that each of said walls 8,9 closes a channel 6,7 and overflows into the chamber 3. The wall 9 provided with the secondary openings 11 is arranged in the insert 1, in such a way that said secondary openings 11 are situated in the area of the channel 6 which said wall 8,9 closes. In this way, these secondary openings 11 ensure a direct communication between the chamber 3 and the channel 6 concerned. These secondary openings 11 are intended to visualize the level of filling of the chamber 3 with the connecting liquid 4.

Figure 3:
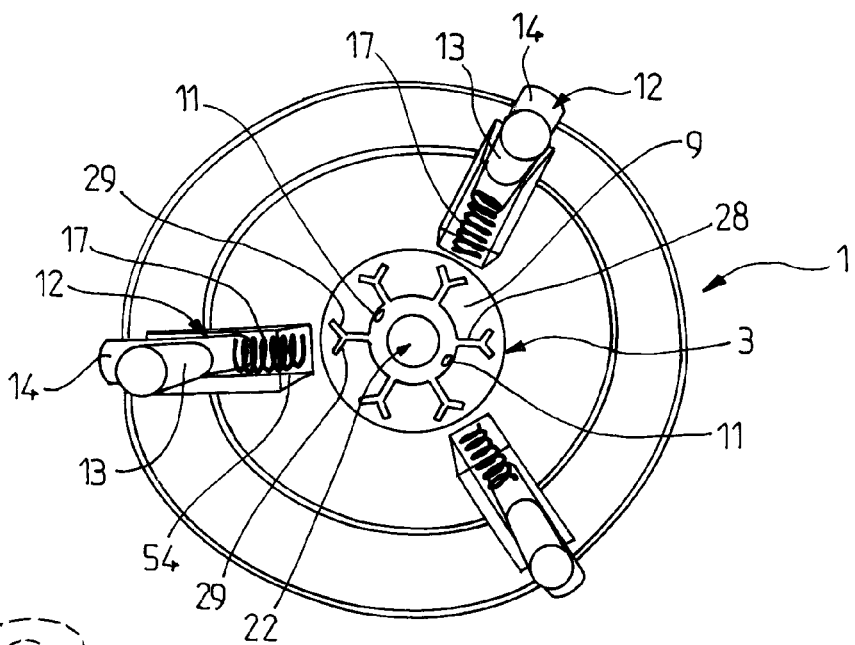
FIG. 3 is a top view and a cut-away view of the insert in FIGS. 1A and 2.

With reference to FIGS. 2 and 3, the body 5 of the insert 1 has three means 12 for mounting said insert 1 in the first object. These three means 12 are distributed in a homogeneous manner around the body 5, two consecutive means 12 being arranged in radial directions of the insert 1 and forming between them an angle of 120°. Each means 12 has an elongated cylindrical portion 13 and a shortened cylindrical portion 14, said portions 13,14 forming a right angle between them. Each means 12 is implanted in the body 5 of the insert 1, in such a way that the elongated portion 13 extends parallel to the axis of revolution of said body 5, and in such a way that the shortened portion 14 is oriented in a radial direction of said body 5. One extremity of each elongated portion 13 projects from a circular end face 15,16 of the body 5. Two prestressed springs 17 are inserted between the elongated portion 13 of a means 12 and an internal supporting wall 54 of the body 5 of the insert 1, in order to push back said means 12 towards the exterior of said wall 18, in such a way as to cause a part of the shortened portion 14 to project from of said body 5. It should be noted that this supporting wall 54 is positioned closer to the centre of the insert 1 than the elongated portion 13 of each mounting means 12.

With reference to FIGS. 1A, 1B, 2 and 5, the mobile guide pin 2 is elongated and is of cylindrical shape. In its longitudinal axis, said pin 2 has one flared extremity 21, hollowed out by a rounded cavity 42, of which the surface can be likened to a portion of a sphere. This cavity 42 has an axis of revolution which is combined with the axis of revolution of the cylindrical pin 2. The cross section of the cavity 42 varies in a monotonic manner in its axis of revolution, said cavity 42 being positioned at the extremity of the pin 2 so that its most flared section is situated in the area of an end edge of said pin 2 considered in relation to its longitudinal axis. The mobile guide pin 2 is positioned in the insert 1 so that the flared extremity 21 is situated inside the chamber 3. More precisely, said pin 2 passes through one 7 of the two internal channels, being parallel to the axis of revolution of said channel 7, and passes through the principal opening 10 in one 8 of the two convex walls bordering the chamber 3. The other extremity of the pin 2, considered in relation to its longitudinal axis, projects from the insert 1 and will serve as a base for the attachment of the second object.

With reference to FIGS. 1A, 1B, 2 and 3, the first possible embodiment of an attachment device according to the invention in addition comprises an inlet conduit 22 in the form of a hollow and elongated cylindrical tube, of which a first extremity 23 is connected to a reservoir (not illustrated) of connecting liquid 4, which is located at the exterior of the insert 1, and of which a second extremity is situated in the interior of the chamber 3 of the insert 1. This second extremity is constituted by an enlarged cylindrical nozzle 25, of which the axis of revolution is combined with the axis of revolution of said conduit 22. This nozzle 25 is composed of an internal cylindrical wall and an external cylindrical wall arranged in a concentric manner, and leaving between them a space which is in communication with the internal channel of the tube constituting the inlet conduit 22. The external cylindrical wall comprises several rows of holes 26 each extending in the axis of revolution of said nozzle 25. The rows are distributed evenly around the nozzle 25 in such a way as to diffuse, in an isotropic manner, the liquid 4 into the chamber 3. The internal cylindrical wall is closed at one of its extremities by a full circular face. The inlet conduit 22 is placed in the insert 1 so that the nozzle 25 is situated inside the chamber 3. More precisely, said inlet conduit 22 passes through one 6 of the two internal channels, being parallel to the axis of revolution of said channel 6, and passes through the principal opening 10 in the concave wall 9 bordering the chamber 3 and provided with the secondary openings 11.

With reference to FIG. 3, the nozzle 25 likewise comprises a plurality of engagement elements 27 originating in the area of the external surface of the external wall of said nozzle 25. Each engagement element can be likened to a pin 27 constituted by a principal rod 28, of which one extremity is extended by two segments 29 that are divergent and of the same length. Said pins 27 are implanted on the nozzle 25 in such a way that each principal rod 28 extends radially in relation to said nozzle 25, the two segments 29 thus being located at a distance from the external wall of said nozzle 25. These engagement elements 27 constitute profiled reliefs permitting the conditions of adhesion of the solidified liquid 4 to the inlet conduit 22 to be increased. In fact, these engagement elements 27 will help to prevent the easy withdrawal of said solidified liquid 4 from said inlet conduit 22.

Figure 4:
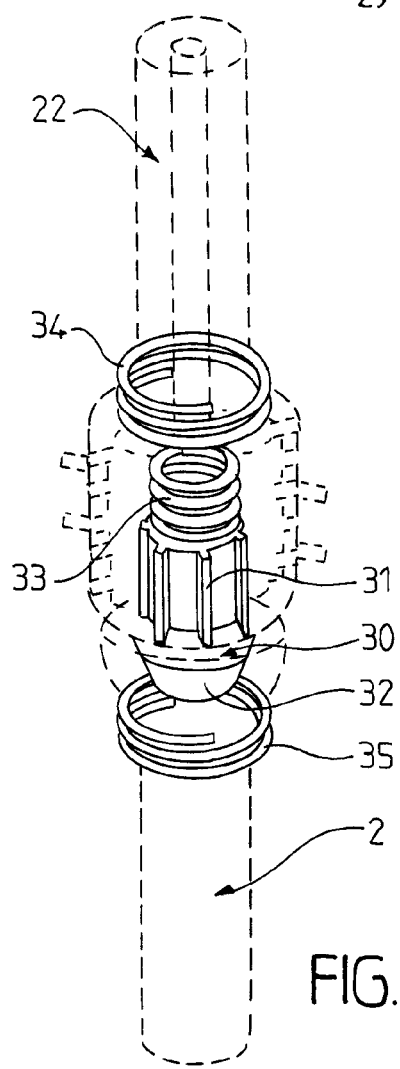
FIG. 4 is a simplified, cut-away view and perspective view of a guide pin connected to a connecting element by means of a connecting means of the insert in FIGS. 1A to 3.

With reference to FIGS. 1A, 1B and 4, the inlet conduit 22 and the mobile guide pin 2 are connected in the interior of the chamber 3 by means of a connecting component 30 having a cylindrical body 31 that is extended by a widened head 32. Said widened head 3 can be likened to a portion of a sphere having a plane circular base. The head 32 is placed on the body 31 of the connecting component 30 in such a way that the plane circular base of said head 32 forms a shoulder together with said body 31, the rounded part of said head 32 constituting one extremity of the connecting component 30. This connecting component 30 is positioned between the inlet conduit 22 and the mobile guide pin 2, so that:

the cylindrical body 31 of said component 30 is placed in the interior of the internal wall of the nozzle 25 for the diffusion of liquid 4, the widened head 32 being located outside said wall. It should be noted that the maximum external diameter of said widened head 32 is greater than the internal diameter of the internal wall of the nozzle 25, so that said head 32 is unable to penetrate into the interior of said nozzle 25.

the rounded part of the widened head 32 of the connecting component 30 is placed in the cavity 42 of the extremity of the guide pin 2.

In this way, the connecting component 30 ensures a mechanical continuity between the guide pin 2 and the inlet conduit 22. A first spring 33 is placed in the interior of the internal cylindrical wall of the nozzle 25, between the extremity of the cylindrical body 31 of the connecting component 30 and the full circular wall closing one of the extremities of said cylindrical internal wall. In this way, the connecting component 30 is able to slide in the interior of the cylindrical internal wall of the nozzle 25. A second spring 34 is positioned in the chamber 3 around the inlet conduit 22, between the nozzle 25 and the concave wall 9 delimiting said chamber 3, in such a way as to press said concave wall 9 against the internal surface of said chamber 3. A third spring 35 is placed inside the chamber 3 around the guide pin 2, between the flared extremity 21 of said pin 2 and the concave wall 8 delimiting said chamber 3, in such a way as to press said concave wall 8 against the internal surface of said chamber 3. The two convex walls 8,9 are thus retained in the insert 1 because, on the one hand, they are fed respectively around the inlet conduit 22 and the guide pin 2, and, on the other hand, they are pushed back against the internal surface of the chamber 3 by the springs 34, 35.

The guide pin 2, the inlet conduit 22 and the connecting component 30 are thus perfectly aligned in the insert 1, in such a way that their axes of revolution are in continuity. The arrangement of the connecting component 30 together with the inlet conduit 22 and the guide pin 2, as well the presence of the three springs 33, 34, 35, permits:

- a translation of the guide pin 2 in the insert 1 in its longitudinal axis, in order to move closer to or further away from the inlet conduit 22, thanks to the sliding of the body 31 of the connecting component 30 in the interior of the diffusion nozzle 25;
- a rotation of the assembly constituted by said guide pin 2, the connecting component 30 and the inlet conduit 22, thanks to the sliding of the two convex walls 8,9 along the internal surface of the chamber 3. Causing the guide pin 2 to rotate will thus result in the simultaneous rotation of the inlet conduit 22.

A method for the attachment of the first object to the second object on the basis of a possible embodiment of an attachment device according to the invention as described in FIGS. 1A, 1B, 2, 3 and 4 involves the following stages.

The insert 1 is introduced into the first object, after each mounting means 12 has been retracted into the body 5 of the insert 1, in such a way that the shortened portion 14 is no longer caused to project towards the exterior of said body 5. This operation is achieved by means of a manipulation of said means 12, in the area of the extremity of each elongated portion 13, which emerges from a circular end face 15,16 of the body 5 of the insert 1. This retraction of said means 12 into the insert 1 takes place at the expense of a certain effort, which is opposed to the pressure exerted by the springs 17 under tension.

The insert 1 slides in the first object until the shortened portions 14 of the mounting means 12 reach a throat of the first object. The insert 1 is then subjected to rotation in order for it to become attached to the first object by means of a device of the bayonet type.

The second object is attached to the guide pin 2 in the area of the projecting extremity of said pin 2 located on the exterior of the insert 1.

The connecting liquid 4 is then released into the inlet conduit 22 of the insert 1, before subsequently being diffused via the nozzle 25 into the chamber 3. The level of filling of the chamber 3 by the liquid 4 may be monitored thanks to the secondary openings 11 in the wall 9 partially delimiting said chamber 3.

Once the chamber has been totally filled with liquid 4, the position of the second object in relation to the first object may then be adjusted by means of the mobile guide pin 2, which is able to be displaced inside the insert 1 both in translation and in rotation. This positional readjustment remains possible for as long as the liquid 4 has not solidified. Once the position of the first object in relation to the second object is considered to be satisfactory, the solidification of the liquid will permit the first object to be attached permanently to the second object.

If the attachment of the first object to the second object were to be found not to be satisfactory, the second object would first be decoupled from the guide pin 2 of the insert 1, and said insert 1 would then be withdrawn from the first object by performing the opposite manipulations to those performed during its assembly. A new insert 1 could then be attached to the first object.

Figure 6:
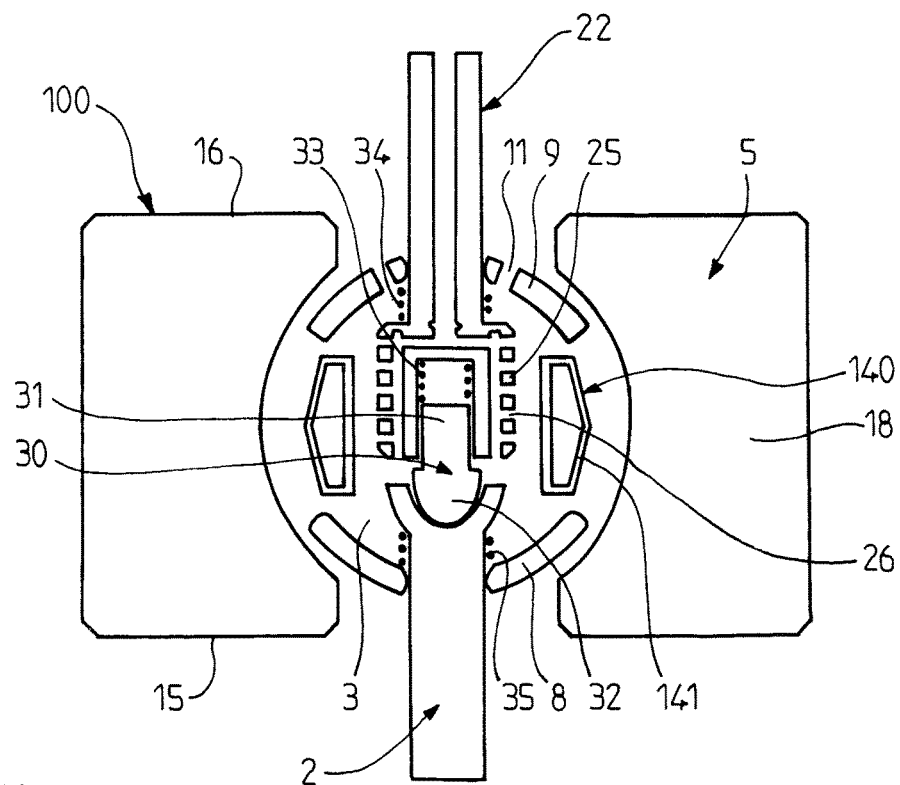
FIG. 6 is a schematic view in cross section of an insert of the second possible embodiment of an attachment device according to the invention, involving the components depicted in FIG. 5.
Figure 7:
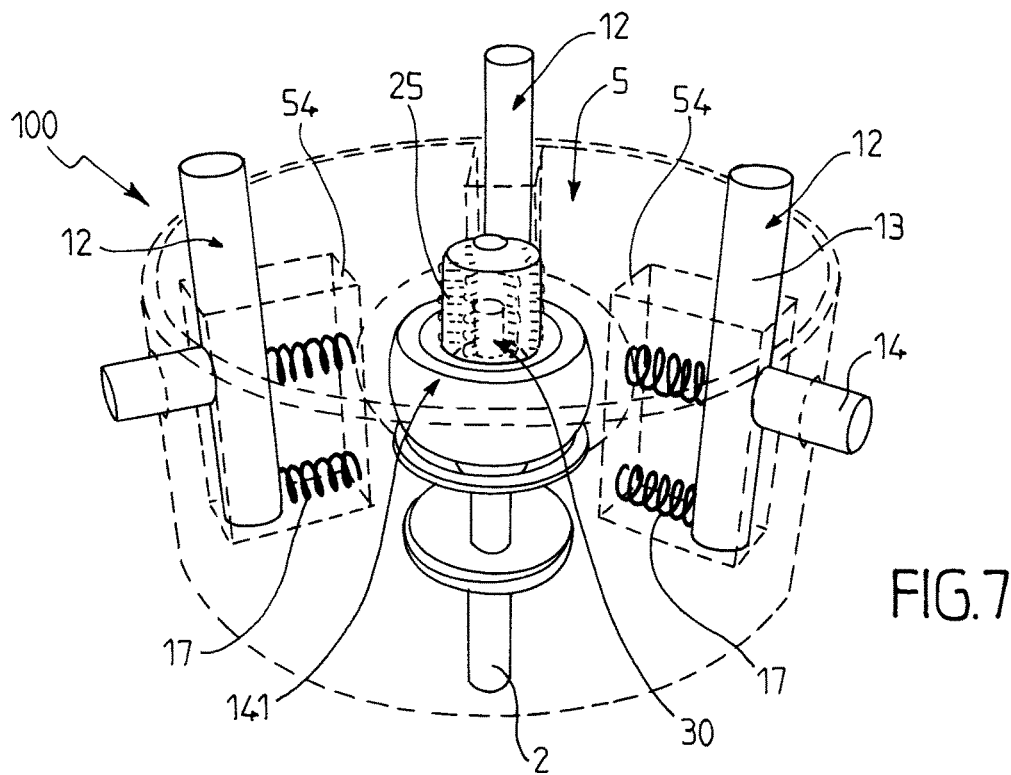
FIG. 7 is a perspective view and a cut-away view of the insert in FIG. 6.

With reference to FIGS. 5, 6 and 7, a second possible embodiment of an attachment device according to the invention differs from the first embodiment described above by the fact that a hollow body 140 has been introduced into the chamber 3. All of the other components described for the first possible embodiment of an attachment device according to the invention remain unchanged for this second embodiment, both on the structural plane and on the functional plane.

The hollow body 140 can be likened to a ring 141 having an axis of revolution, said ring 141 exhibiting central flaring. In other words, this ring 141 is a rounded component extending for a constant length of this axis of revolution, the cross section of said ring having its maximum extent in the area of the mid-point of this length and declining progressively as it moves away on each side of this half of the length, in said axis of revolution. The external diameter of this ring 141 is slightly less than the internal diameter of the chamber 3, so that said ring 141 may be inserted into said chamber 3 while remaining in contact with the internal surface of this chamber 3. The purpose of this hollow ring 141 is to reduce the volume of the chamber 3 and, as a result, the quantity of connecting liquid 4 to be injected into the insert 100. This ring 141 is produced from a light material, for example such as a polymer of the plastic type. Since the internal diameter of the chamber 3 has been reduced in the area of this ring 141, the engagement elements 127 will have had to be readjusted by shortening. In this way, each of said elements 127 now comprises only a single rod, arranged radially on the external surface of the external wall of the nozzle 125.

This second possible embodiment of an attachment device according to the invention ensures precisely the same function as the first possible embodiment described above, while remaining at a reduced mass compared to that involved in said first mode.

Figure 8:
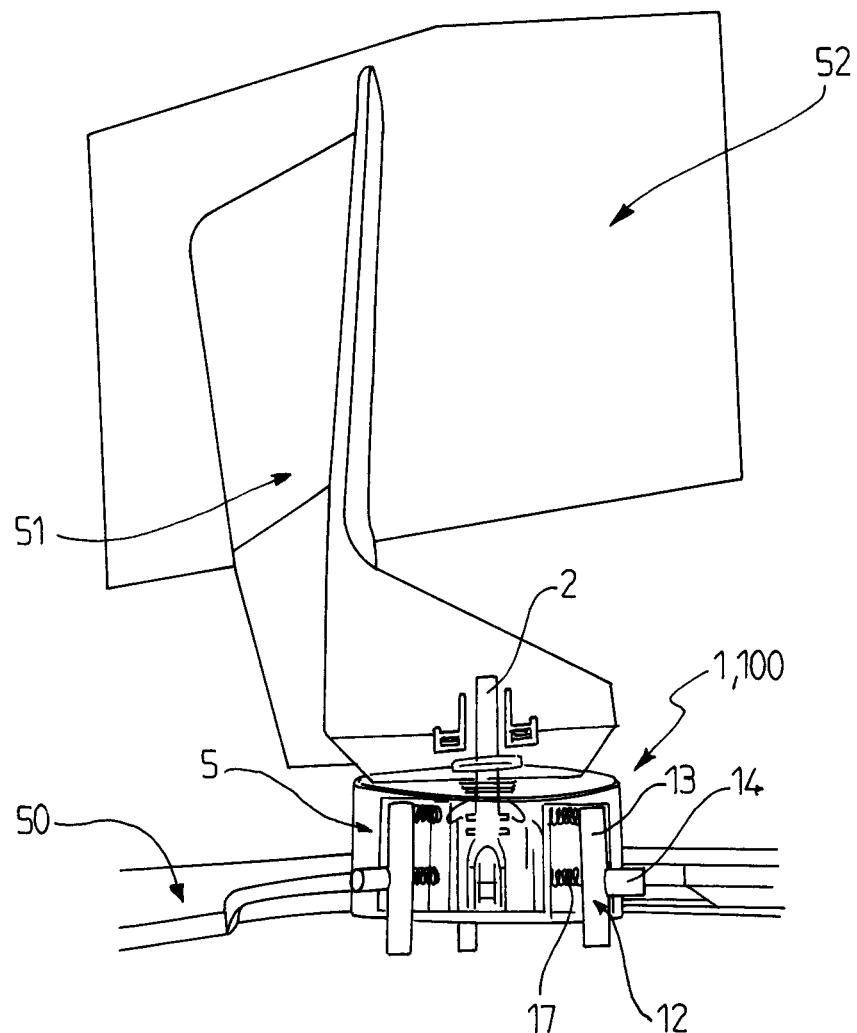
FIG. 8 is a view in cross section of a panel connected to a supporting arm by means of an embodiment of a device according to the invention.

By way of example, with reference to FIG. 8, an attachment device according to the invention permits the attachment of a panel 50 to a supporting arm 51 that is integral with the structure 52 of an installation by means of an interface insert 1,100 in conformity with, for example, the two possible embodiments described previously. This structure 52 may be that of an aircraft, for example.

The insert 1,100 is thus introduced into a cylindrical hole of the panel 50, after each mounting means 12 has been retracted into the body 5 of the insert 1,100 in such a way as no longer to cause the shortened portion 14 to project towards the exterior of said body 5. This operation is achieved by means of a manipulation of said means 12, in the area of the extremity of each elongated portion 13, which emerges from a circular end face 15,16 of the body 5 of the insert 1,100. This retraction of said means 12 into the insert 1,100 takes place at the cost of a certain effort, which is opposite to the pressure exerted by the springs 17 under tension.

The insert 1,100 then slides in the hole of the panel 50 until the shortened portions 14 of the mounting means 12 arrive as far as a groove in the hole. Once these shortened portions 14 reach this groove, they project abruptly from the insert 1,100 under the effect of the springs 17 as they relax, before being inserted into said groove.

The supporting arm is attached to the guide pin 2 in the area of the projecting extremity of said pin 2 located on the exterior of the insert 1.

The connecting liquid 4 is then released into the inlet conduit 22 of the insert 1,100 before subsequently being diffused by the nozzle 25 into the chamber 3.

Once the chamber 3 has been totally filled with liquid 4, the position of the supporting arm 51 in relation to the panel 50 may then be adjusted by means of the mobile guide pin 2, which is able to be displaced inside the insert 1,100 both in translation and in rotation. This positional readjustment remains possible for as long as the liquid 4 has not solidified.

Once the position of the panel 50 in relation to the supporting arm 51 is considered to be satisfactory, the solidification of the liquid 4 will permit the panel 50 to be attached permanently to the supporting arm.

The attachment devices according to the invention have the advantage of presenting a character of universality through the presence of an insert with a constant dimension, thereby making it possible to attach several types of object to other types of object.

They have the additional advantage of being ergonomic, since they are capable of being implemented easily and rapidly without special tooling and without complicated handling.

They possess the further advantage of being able to be implanted in any type of environment, including those which are most difficult to access, because of the reduced space taken up by the insert.

Finally, they are economical as a result of their universal nature, because they avoid the need, on every occasion, to design a specific attachment device for each assembly configuration that is encountered.

Although at least one embodiment of the invention has been illustrated and described here, it should be noted that other modifications, substitutions and alternatives will be apparent to a person skilled in the art and may be changed without departing from the scope of the objet described here. The present application proposes to cover all the adaptations and variations of the embodiments described above. In addition, the expression "comprising" does not exclude other elements or stages, and the expression "one/a/an" does not exclude the plural. In addition, characterizing features or stages which have been described with reference to one of the embodiments disclosed above may likewise be utilized in combination with other characterizing features or stages of other embodiments disclosed above. It should be noted that all the modifications envisaged above must be included within the scope of the patent to the extent that they are part of the contribution of the inventors to the prior art. Such modifications, substitutions and alternatives may be achieved without departing from the framework and the spirit of the present invention.

The invention claimed is:

1. A device for the attachment of a first object to a second object, comprising,
   a hollow insert configured to attach to the first object and delimiting a chamber having an inlet conduit,
   a mobile connecting element inserted into said chamber and configured to attach to the second object, wherein said chamber is configured to receive at least one connecting liquid conveyed via said inlet conduit and which is intended to solidify in order to set the relative position between the hollow insert and the mobile connecting element, said mobile connecting element being an elongated guide pin (a) emerging from the hollow insert and (b) including an extremity terminating in the interior of the chamber, the inlet conduit having one extremity discharging into the interior of the chamber and terminating in a nozzle provided with at least two holes for the diffusion of the connecting liquid,
   wherein the elongated guide pin and the inlet conduit are mechanically connected one to the other, inside the chamber, by means of a connecting component, and wherein said connecting component is configured to permit said elongated guide pin and said inlet conduit to be aligned in the same axis.

2. The device for the attachment according to claim 1, wherein the connecting component is configured to permit an adjustment of the relative position between the two objects for as long as the connecting liquid has not solidified, followed by setting of said position by solidification of said liquid.

3. The device for the attachment according to claim 1 wherein the device includes a source of connecting liquid in communication with the inlet conduit.

4. The device for the attachment according to claim 3, wherein the source of connecting liquid is situated outside the hollow insert.

5. The device for the attachment according to claim 1, wherein the elongated guide pin is capable of displacement in translation into the hollow insert along the longitudinal axis of the elongated guide pin.

6. The device for the attachment according to claim 1, wherein the elongated guide pin is rotatably mounted in the hollow insert, so that the elongated guide pin is able to pivot in all directions.

7. The device for the attachment according to claim 1, wherein the nozzle is provided with a plurality of projecting engagement elements configured to increase the conditions of contact between the connecting liquid and the inlet conduit.

8. The device for the attachment according to claim 1, wherein the connecting component is in contact with a prestressed return device interacting with the nozzle in order to permit the elongated guide pin to be displaced in translation in the longitudinal axis the elongated guide pin in order to move closer to the nozzle of the inlet conduit.

9. The device for the attachment according to claim 1, wherein the chamber is spherical and is delimited by two mobile rounded walls, a first wall of the two mobile rounded walls being passed through by the inlet conduit and a second wall of the two mobile rounded walls being passed through by the elongated guide pin, and wherein the ensemble including said elongated guide pin, the connecting component and said inlet conduit is capable of pivoting in the hollow insert by sliding of said two mobile rounded walls along the internal surface of said chamber.

10. The device for the attachment according to claim 9, wherein a first prestressed member is placed in the interior of the chamber around the inlet conduit between the nozzle and the first wall that is passed through by said inlet conduit in order push back said first wall against the internal surface of the chamber, and a second prestressed member is placed in the interior of the chamber around the elongated guide pin between one extremity of said elongated guide pin and the second wall that is passed through by the elongated guide pin in order to push back said second wall against the internal surface of the chamber.

11. The device for the attachment according to claim 1, wherein a hollow and light body is included in the chamber to reduce the volume occupied by the connecting liquid.

12. The device for the attachment according to claim 1, wherein the connecting liquid is a premixed resin.

13. Attachment device according to claim 1, wherein the connecting liquid comprises an elastomer and an agent for the polymerization of said elastomer.

14. The device for the attachment according to claim 1, wherein the hollow insert is configured to be attached to the first object by means of reversible connecting member permitting the withdrawal of the hollow insert.

15. The device for the attachment according to claim 14, wherein the reversible connecting member comprises at least one prestressed retractable finger.

16. The device for the attachment according to claim 1, wherein the chamber is spherical and is delimited by two mobile rounded walls, a first wall of the two mobile rounded walls being passed through by the inlet conduit and a second wall of the two mobile rounded walls being passed through by the elongated guide pin.

17. A method for the attachment of a first object to a second object, wherein the method comprises providing the device for attachment of claim 1, attaching the hollow insert to the first object, attaching the mobile connecting element of the hollow insert to the second object, injecting the connecting liquid into the chamber of the hollow insert, and attaching the first object onto the second object by solidification of said connecting liquid inside said chamber.

18. An aircraft comprising at least one attachment device for the attachment of a first object to a second object, the attachment device comprising:

a hollow insert configured to attach to the first object and delimiting a chamber having an inlet conduit, and a mobile connecting element inserted into said chamber and configured to attach to the second object, wherein said chamber is configured to receive at least one connecting liquid conveyed via said inlet conduit and which is intended to solidify in order to set the relative position between the hollow insert and the mobile connecting element, said mobile connecting element being an elongated guide pin (a) emerging from the hollow insert and (b) including an extremity terminating in the interior of the chamber, the inlet conduit having one extremity discharging into the interior of the chamber and terminating in a nozzle provided with at least two holes for the diffusion of the connecting liquid, wherein the elongated guide pin and the inlet conduit are mechanically connected one to the other, inside the chamber, by means of a connecting component, and wherein said connecting component is configured to permit said elongated guide pin and said inlet conduit to be aligned in the same axis.

19. The aircraft according to claim 18, wherein the connecting component is configured to permit an adjustment of displacement between the elongated guide pin and the inlet conduit.

20. The aircraft according to claim 18, wherein the connecting component includes a widened head with plane circular base and the elongated guide pin includes a rounded cavity on the extremity inside the chamber, the rounded cavity being configured to rotatably engage the widened head of the connecting component.

* * * * *